United States Patent [19]

Fleischer et al.

[11] 4,448,861
[45] May 15, 1984

[54] LITHIUM-THIONYL CHLORIDE CELL WITH LITHIUM SURFACE ALLOYS TO REDUCE VOLTAGE DELAY

[75] Inventors: Niles A. Fleischer, Madison; Ronald J. Ekern, Verona, both of Wis.

[73] Assignee: Rayovac Corporation, Wis.

[21] Appl. No.: 507,666

[22] Filed: Jun. 24, 1983

[51] Int. Cl.³ .............................................. H01M 4/36
[52] U.S. Cl. ...................................... 429/105; 429/50; 429/196
[58] Field of Search .................. 429/105, 196, 218, 50

[56] References Cited

U.S. PATENT DOCUMENTS 3,926,669 12/1975 Auborn ................................ 429/218
4,091,152 5/1978 Rao et al. .............................. 429/105
4,093,784 6/1978 Driscall ............................ 429/105 X
4,143,214 3/1979 Chang et al. ..................... 429/196 X
4,318,969 3/1982 Peled et al. ....................... 429/196 X
4,327,159 4/1982 Jones et al. ....................... 429/196 X
4,335,191 6/1982 Peled ............................... 429/196 X

FOREIGN PATENT DOCUMENTS 1409307 10/1975 United Kingdom .

Primary Examiner—Charles F. Lefevour
Attorney, Agent, or Firm—Kenyon & Kenyon

[57] ABSTRACT

A lithium-thionyl chloride cell which has a lithium-aluminum alloy at the anode surface for reducing voltage delay.

6 Claims, 2 Drawing Figures

LITHIUM-THIONYL CHLORIDE CELL WITH LITHIUM SURFACE ALLOYS TO REDUCE VOLTAGE DELAY

The invention is directed to lithium-thionyl chloride cells, and, more particularly, to special lithium anodes which reduce voltage delay in such cells.

BACKGROUND OF THE INVENTION AND THE PRIOR ART

Lithium-thionyl chloride cells are known from such sources as U.S. Pat. No. 3,926,669, U.K. Patent Specification No. 1,409,307 and elsewhere. Such systems are considered to offer high energy density and great promise in many service applications where light weight in proportion to capacity is important. The unique feature of such systems is that the liquid material, thionyl chloride or its equivalent performs the dual function of acting as electrolyte carrier (for an electrolyte salt which is conventionally $LiAlCl_4$) and cathode depolarizer. Thus, the cathode depolarizer directly contacts the anode metal, which is usually highly active lithium metal. It is found that as a result of such direct contact, a film forms on the lithium anode leading to polarization thereof. Such polarization leads to the phenomenon of voltage delay, wherein the voltage delivered by the cell when it is placed under load after storage is substantially below cell capability for some time. This characteristic is a definite handicap, particularly in powering electronic devices which require a constant voltage.

SUMMARY OF THE INVENTION

The problem of voltage delay in lithium-thionyl chloride cells is reduced by applying to the surface of the lithium anode a thin covering of aluminum.

DETAILED DESCRIPTION OF THE INVENTION

In accordance with the invention, aluminum foil, which need be no thicker than 0.008 mm, e.g., about 0.008 to about 0.051 mm, is applied to the lithium anode surface and assembled in contact with the electrolyte which usually is $LiAlCl_4$ dissolved in thionyl chloride. Alloying of lithium with the thin aluminum layer readily takes place and it is found that the anode film which produces voltage delay of cells so produced is diminished as compared to similar cells having lithium anodes of commercial purity with no surface layer of aluminum. As noted, the aluminum foil laminated to the lithium is quite thin and may be expressed in terms of about 1% to possibly 14% of the total thickness of the composite. During formation of the alloy layer, the anode surface becomes roughened and wrinkled.

Examples will now be given.

Experimental anodes were prepared from pure lithium strip; from rolled strip of lithium-aluminum alloy of uniform composition containing 84% lithium by weight and from lithium strips 0.038 cm thick laminated, respectively, with 0.023 mm Al-Mg foil (Alloy 5052 containing 2.5% Mg, by weight) and with aluminum foil 0.023 mm thick. Anodes of each description were stored at 20° C. and at 71° C. in thionyl chloride containing 1.6 M $LiAlCl_4$. The laminated anodes were stored in electrolyte for 5 days with the aluminum or aluminum-magnesium alloy foil layers in contact with electrolyte while the solid anodes were stored for 4 days. Slight pressure was applied to the laminated anodes.

Figure 1:
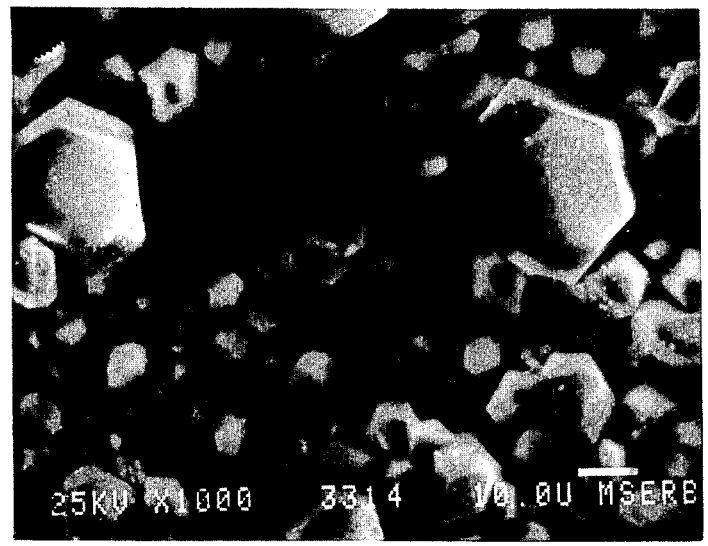
FIG. 1 is a scanning electron micrograph (SEM) taken at 1000 diameters showing the surface film developed on lithium upon exposure for 5 days at 71° C. to an electrolyte of $LiAlCl_4$ dissolved in thionyl chloride.
Figure 2:
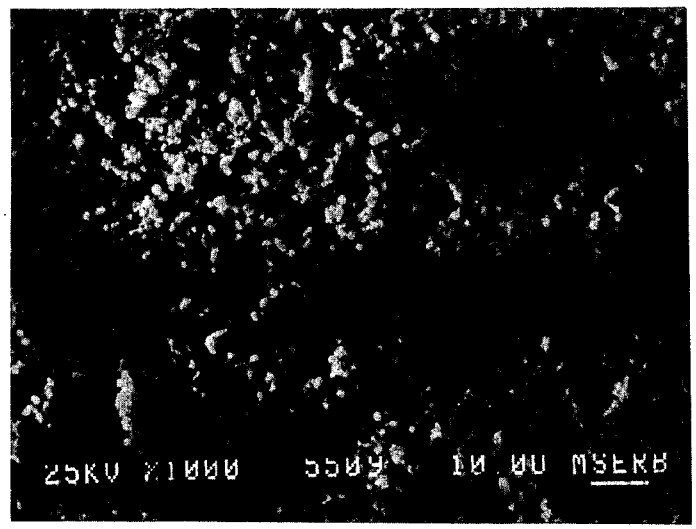
FIG. 2 is an SEM photograph, also taken at 1000 diameters showing the surface film developed on lithium having a surface aluminum foil applied thereto after similar exposure.

After removal from the electrolyte, the anodes were examined by scanning electron micrography (SEM). The surface films on the lithium, the homogeneous Li-Al alloy and on the laminate having the Al-Mg layer were similar in appearance and were characterized by blocky, densely spaced crystals believed to be LiCl. A representative SEM view of the surface film formed on lithium is shown in FIG. 1, taken at 1000 diameters. In contrast, the surface film on the aluminum laminate displayed smaller crystals which were packed more loosely. This is shown by SEM in FIG. 2, also taken at 1000 diameters.

It appears likely that the aluminum-laminated lithium forms a surface alloy by diffusion. The presence of the alloy at the electrolyte-contacting anode surface appears to limit and modify the growth of the voltage delay-causing film. It also appears that, as the cell is discharged, the integrity of the surface alloy is preserved while it remains in contact with the lithium substrate. Accordingly, the aluminum layer may be quite thin, possibly to the extent of atoms in thickness.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. In a lithium-thionyl chloride cell, the improvement for reducing voltage delay which comprises using an anode consisting of a lithium substrate having a thin lithium-aluminum alloy at the anode surface exposed to electrolyte.

2. A lithium thionyl chloride cell in accordance with claim 1 wherein said anode surface is formed by initially laminating a thin aluminum foil to said lithium substrate.

3. A cell in accordance with claim 2 wherein said aluminum foil has about 1% to about 14% the thickness of said lithium subtrate.

4. The method for reducing voltage delay in a lithium-thionyl chloride cell which comprises employing as anode in said cell a body consisting of lithium having a thin lithium-aluminum alloy at the anode surface exposed to electrolyte.

5. The method in accordance with claim 4 wherein said anode surface is formed by initially laminating a thin aluminum foil to said lithium body.

6. The method in accordance with claim 5 wherein said aluminum foil has about 1% to about 14% the thickness of said lithium body.

* * * * *